United States Patent [19]
Feikema et al.

[11] Patent Number: 4,645,011
[45] Date of Patent: Feb. 24, 1987

[54] LAWN EDGER DEVICE

[76] Inventors: Roger Feikema; Harry J. Bakker, both of 6050 Palmer Blvd., Sarasota, Fla. 33582

[21] Appl. No.: 722,070

[22] Filed: Apr. 11, 1985

Related U.S. Application Data

[63] Continuation-in-part of Ser. No. 537,072, Sep. 29, 1983, Pat. No. 4,532,998.

[51] Int. Cl.$^4$ ............................................. A01B 45/04
[52] U.S. Cl. ...................................... 172/15; 56/17.1; 56/11.6
[58] Field of Search ...................... 172/13, 14, 15, 16, 172/17; 56/16.7, 11.6, 11.7, 11.8, 10.8, 17.1

[56] References Cited

U.S. PATENT DOCUMENTS

| | | | |
|---|---|---|---|
| 2,882,977 | 4/1959 | Smith | 172/15 |
| 2,979,837 | 4/1961 | Hunter | 172/15 |
| 3,079,743 | 3/1963 | Egley | 172/15 X |
| 3,338,314 | 8/1967 | Meltzer | 172/15 |

FOREIGN PATENT DOCUMENTS

787119  6/1968  Canada ................................. 172/15

*Primary Examiner*—Richard J. Johnson
*Attorney, Agent, or Firm*—Frijouf, Rust & Pyle

[57] ABSTRACT

A lawn edger device is disclosed having a motor and a cutter blade supported by a platform and a handle mounted hand control for varying the depth of the cutter blade relative the ground. The platform includes a first and a second end, the first end being supported by a first set of ground engaging wheels. A first arm is pivotally connected to the second end of the platform. The distal end of the first arm rotatably supports a second set of the ground engaging wheels. A connecting arm is secured to the first arm and includes a toothed portion which cooperates with a locking plate rigidly connected to the platform. The toothed portion cooperates with the locking plate to variably adjust the longitudinal disposition of the connection arm relative the locking plate. The hand control is pivotally connected to the connecting arm to release the toothed portion from the locking plate to permit movement of the connecting arm and thereby effect adjustment of the depth of the cutter blade relative the ground upon movement of the first arm. In an alternative embodiment, an edger includes wheels rotatably secured to a frame. A motor supporting platform is pivotally secured to the frame and a cutter blade support is pivotally connected to the frame with the pivotal axis of the cutter blade and support platform being parallel to each other. A hand control connected to a position retaining device remotely controls the depth of the cutter blade relative the ground.

14 Claims, 10 Drawing Figures

LAWN EDGER DEVICE

CROSS REFERENCE TO RELATED PATENT APPLICATIONS

This application is a continuation in part of U.S. patent application, Ser. No. 537,072 filed Sept. 29, 1983, all subject matter set forth in application Ser. No. 537,072, now U.S. Pat. No. 4,532,998, is hereby incorporated by reference.

BACKGROUND OF THE INVENTION

1. Field of the Invention

This invention relates to a mobile device having a plurality of ground engaging wheels, a load supporting platform and a hand control for varying the angle defined by the platform and the ground. More specifically, this invention relates to a lawn edger device and the like.

2. Information Disclosure Statement

The average usage of a motorized lawn edger is eight hours per year. Because of the considerable stress imposed upon a lawn edger during operation of the same, the useful life of a motorized edger is forty hours. Therefore, on the average, a lawn edger must be repaced every five years and this imposes a relatively heavy financial burden on a person responsible for lawn maintenance.

In an effort to increase the ruggedness of construction of conventional lawn edgers, the handle has been fabricated as a relatively massive and reinforced structure in order to withstand the strain of manual variation of the depth of cut of the cutter blade. Usually, a system of arms and levers connect the cutter blade housing to the handle so that by manually pivoting a lever on the handle, the depth of cut can be controlled. In the prior art devices, if the handle were not of massive construction, there would exist a tendency for the arms and levers to buckle under the stress of vibration and when the cutter is cutting through relatively thick root systems. The heavy and reinforced structure of traditional edger handles increases the cost of manufacture of the same and the present invention provides a device for adjustably varying the depth of cut of the cutter blade of a lawn edger that avoids the need of such costly handles.

The adjustable depth hand control of the present invention overcomes the aforementioned inadequacies of the prior art devices by providing a simple and low cost pawl and ratchet mechanism that permits the variable adjustment of the cutter blade relative the ground or the like.

Although the prior art lawn edgers provide a reliable mechanism for adjusting either the depth of cut of the cutter blade relative the lawn and the angle at which the edge is cut, the prior art proposals have been relatively expensive to produce. It is the primary object of the present invention to provide a variably adjustable depth hand control for a lawn edger or the like that overcomes the aforementioned inadequacies of the prior art devices and provides an improvement which significant contributes to the ease with which such lawn edgers can be made and therefore the low cost of production of the same.

In our prior patent application Ser. No. 537,072 filed Sept. 29, 1983, now U.S. Pat. No. 4,532,998 the invention disclosed therein solved many of the problems of the prior art. However, the invention disclosed therein was limited in adjustment only in a cutting depth direction. It is an object of the present invention to further improve upon our prior invention by enabling adjustment both for cutting depth and angle of the cutting blade.

Another object of the present invention is the provision of a lawn edger having a relatively lightweight handle and hand control for variably adjusting the depth of the cutter blade relative the ground.

Another object of the present invention is the provision of a lawn edger having a platform with first wheel means connected to the first end of the platform and with a first arm having second wheel means pivotally mounted to the second end of the platform with a connecting arm varying the rotatable position of the first arm relative to the platform to vary the height of the second end of the platform relative to the ground.

Another object of the present invention is the provision of a lawn edger having a connecting arm including a portion having a plurality of teeth for cooperating with a locking plate for variably fixing the disposition of the second end of the platform relative the ground.

Another object of the present invention is the provision of a lawn edger having a relatively lightweight handle which is rigidly connected to and extends angularly relative to the platform.

Another object of the invention is the provision of a lawn edger having a motor or an engine disposed on the platform whereby the motor or engine moves in unison with the adjustment of the cutter blade.

Another object of this invention is the provision of a lawn edger wherein the motor or engine is fixedly mounted relative to the cutter blade enabling the motor or engine to move in unison with the cutter blade upon adjustment of the depth of the cutter blade.

Another object of this invention is the provision of a lawn edger wherein the weight of the motor or engine is directly translated to effect downward pressure on the cutter blade.

Another object of this invention is the provision of a lawn edger wherein the connecting arm may be readily fabricated and assembled.

Another object of the present invention is the provision of a lawn edger which simplifies the interconnection between the motor or engine and the cutting blade.

Another object of the invention is the provision of a lawn edger wherein the depth of the cutting blade relative to the ground may be efficiently and positively controlled and wherein the stress of maintaining the cutting blade in a selected position is absorbed by a toothed portion of the connecting arm and a locking plate secured to the platform.

Another object of the present invention is the provision of a lawn edger in which a plurality of ground-engaging wheels maintain the frame of the edger at a constant distance from the ground and a motive means support platform and cutter blade support means are both pivotally secured to the frame of the edger.

Another object of the present invention is the provision of a lawn edger having a cutter blade support means and a position retaining means pivotally connected to the support means, the retaining means cooperating with the frame for varying the pivotal disposition of the cutter blade support means relative to the frame for variably adjusting the depth of the cutter blade relative to the ground.

Another object of the present invention is the provision of a lawn edger having a hand control means connected to the position retaining means for remotely controlling the disposition of the position retaining means relative to the frame for adjustably varying the depth of the cutter blade relative to the ground.

Another object of the present invention is the provision of a lawn edger having a handle pivotally secured to the frame such that the handle pivots from a first position for storage and shipping of the edger to a second position in which the handle is disposed substantially upright for permitting hand control of the lawn edger during use.

Another object of the present invention is the provision of a lawn edger including a position retaining means and a clutch means for selectively permitting the cutter blade to be driven by the motive means.

Another object of the present invention is the provision of a lawn edger having a platform for supporting the motive means and a cutter blade support means such that the platform and the support means pivot about the same pivotal axis.

Another object of the present invention is the provision of a lawn edger having a debris flap rigidly secured to the cutter blade support means for preventing debris being thrown rearwardly from the cutter blade.

Another object of the present invention is the provision of a lawn edger having a position retaining means including a third arm having a plurality of indentations along the length thereof and stop means extending from the frame for selectively cooperating with one of the plurality of indentations for variably adjusting the pivotal disposition of the cutter blade relative to the frame.

Another object of the present invention is the provision of a lawn edger in which the hand control means includes an elongated rod having a proximal and a distal end, the proximal end of the rod being pivotally secured to the position retaining means and the distal end of the rod slidably cooperating with the distal end of the handle such that movement between the rod and the handle results in movement of the position retaining means relative to the frame for varying the depth of the cutter blade relative to the ground.

Another object of the present invention is the provision of a lawn edger having a handle and a locking means removably extending within aligned holes defined respectively by the handle and the frame.

Another object of the present invention is the provision of a lawn edger having clutch means further including a foot-operated lever and an extension of the platform cooperating with the lever, with a biasing means extending between the lever and the motive means, and lost motion means disposed respectively at the end of the lever and the extension such that when the lever is pivoted by application of pressure to one end of the lever in use of the edger, the lever pivots in opposition to the biasing means to urge the extension and the platform from a first position of the platform in which the motive means is drivingly connected to the cutter blade to a second position of the platform in which the motive means is disconnected from the cutter blade.

Another object of the present invention is the provision of a clutch means which includes a drive pulley and a driven pulley rigidly connected respectively to the motive means and the cutter blade, and a drive belt cooperating with the pulleys for selectively driving the cutter blade.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention within the scope of the invention. Accordingly, other objects and a fuller understanding of the invention may be had by referring to the summary of the invention and the detailed description describing the preferred embodiment in addition to the scope of the invention defined by the claims taken in conjunction with the accompanying drawings. This invention should not be construed as limited to lawn edgers but should include ground tillers, rotary trench cutters, road line markers, sports field marking machines and the like.

SUMMARY OF THE INVENTION

The lawn edger of the present invention is defined by the appended claims with a specific embodiment shown in the attached drawings. For the purpose of summarizing the invention, the invention relates to a lawn edger having a motor or power means and a cutter blade. The lawn edger includes a platform having a first and a second end with a first wheel means connected relative to the first end of the platform for supporting the first end of the platform at a substantially fixed distance from the ground. A first arm is pivotally connected proximate the second end of the platform. A second wheel means is rotatably mounted to the first arm. The cutter blade is disposed adjacent the second end of the platform. A locking plate means is rigidly connected to the platform. A connecting arm means is pivotally connected to the first arm. The connecting arm means has a toothed portion for cooperation with the locking plate means. Control means intermediate the connecting arm means and the handle mounted hand control controls the movement of the toothed portion relative the locking plate. The toothed portion of the connecting arm means cooperates with the locking plate means to movably adjust the longitudinal disposition of the toothed portion relative the plate. The distal end of the second portion is pivotally connected to the control means for varying the disposition of the platform relative the ground.

In a more specific embodiment of the invention, the handle is angularly disposed relative the longitudinal plane of the platform and the first end of the platform is rigidly secured to the handle. A first axle is disposed adjacent the first end of the platform for supporting the first rotatable wheel means. A second axle is rotatably disposed adjacent the second end of the platform and the first and a second arm are rigidly connected to and extend radially relative the longitudinal axis of the second axle which is parallel to the first axle. A third axle is supported adjacent the distal end of the first arm such that the third axle is parallel to the second axle, the third axle supporting a second rotatable wheel means. A third arm disposed parallel the first arm supports the third axle adjacent the distal end thereof such that the first and third arms are disposed between the second wheel means. The second arm and a first portion of the connecting arm are disposed on the same side of the longitudinal plane of the platform as the handle, and the toothed portion of the connecting arm is disposed on the opposite side of the longitudinal plane of the platform relative the handle. The connecting arm extends normal to the longitudinal axis of the second axle. A bracket extends from the handle and defines a hole through which the hand control extends such that when the hand control is pulled longitudinally relative the handle, the distal end of the toothed portion is pulled towards the bracket to release the toothed portion from engagement with the locking plate to permit pivoting of the first arm relative the platform.

In a further embodiment of the present invention, a lawn edger having motive means and a cutter blade includes a frame and a plurality of ground engaging wheels rotatably secured to the frame for movably supporting the frame at a constant distance from the ground. A platform for supporting the motive means is pivotally secured to the frame, and a cutter blade support means for rotatably supporting the cutter blade is pivotally connected to the frame such that the pivotal axes of the cutter blade support means and the pivotal axis of the platform are parallel relative to each other. The cutter blade is rotated by the motive means. A position retaining means is pivotally connected to the cutter blade support means with the position retaining means cooperating with the frame for varying the pivotal disposition of the cutter blade support means relative to the frame. A control means is connected to the position retaining means for remotely controlling the disposition of the position retaining means relative to the frame for adjustably varying the depth of the cutter blade relative to the ground.

In a more specific embodiment of the alternative embodiment of the present invention, the lawn edger includes a handle pivotally secured to the frame such that the handle pivots from a first position in which the handle is disposed in close proximity relative to the cutter blade and the motive means for storage and shipping of the lawn edger to a second position of the handle in which the handle is disposed remote from the cutter blade and the motive means in a substantially upright position for permitting hand control of the lawn edger during use of the edger.

The lawn edger further includes a clutch means for selectively permitting the cutter blade to be driven by the motive means. Furthermore, the frame includes a leading and a trailing end, and a leading wheel of the plurality of ground engaging wheels is rotatably secured to the leading end of the frame, and a pair of trailing wheels of the plurality of ground engaging wheels is rotatably secured to the trailing end of the frame.

In the more specific alternative embodiment of the lawn edger, the platform and the cutter blade support means pivot about the same pivotal axis, and the cutter blade support means further includes a first arm having a proximal and a distal end. The proximal end of the first arm is pivotally connected to the frame, and the distal end of the first arm rotatably supports the cutter blade. A second arm having a proximal and a distal end is rigidly connected to the proximal end of the first arm, the second arm extending angularly away from the first arm. A debris flap is rigidly secured to the second arm for inhibiting passage of debris from the rotating cutter blade past the debris flap.

The position retaining means further includes a third arm having a proximal and a distal end, the proximal end of the third arm being pivotally connected to the cutter blade support means for controllably maintaining the angular disposition of the support means relative the ground. A plurality of indentations are defined by the third arm, the indentations being spaced longitudinally along the third arm. Stop means such as a stud extend from the frame for selectively cooperating with one of the plurality of indentations such that the pivotal disposition of the cutter blade support means is variably adjustable relative to the frame.

The hand control means further includes a handle having a proximal and a distal end, the proximal end of the handle being secured to the frame for permitting guidance of the lawn edger during use of the edger. An elongated rod having a proximal and a distal end is pivotally secured to the position retaining means. The distal end of the rod slidably cooperates with the distal end of the handle such that relative movement between the distal end of the rod and the distal end of the handle results in movement of the position retaining means relative to the frame for varying the depth of the cutter blade relative to the ground.

The handle of the lawn edger is pivotally secured to the frame such that the handle and the frame respectively define holes which are aligned relative to each other when the handle is disposed in the second position. Locking means removably extend within the aligned holes for locking the handle in the second position during use of the lawn edger. Removal of the locking means permits folding of the handle to the first position when the locking means is removed from between the holes.

The lawn edger includes a clutch means which incorporates a foot operated lever having a first and a second end. The lever is pivotally connected to the frame. An extension of the platform cooperates with the second end of the lever, and a biasing means such as a tension spring extending between the lever and the motive means. A lost motion means is defined respectively by the second end of the lever and by the extension such that when the lever is pivoted by application of pressure to the first end of the lever in use of the edger, the lever pivots in opposition to the biasing means to urge the extension and the platform from a first position of the platform in which the motive means is drivingly connected to the cutter blade to a second position of the platform in which the motive means is disconnected from the cutter blade. The clutch means also includes a drive and a driven pulley rigidly connected respectively to the motive means and the cutter blade and a drive belt cooperating with the pulleys for selectively driving the cutter blade.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structure for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts through the several views of the drawings.

DETAILED DESCRIPTION

Figure 1:
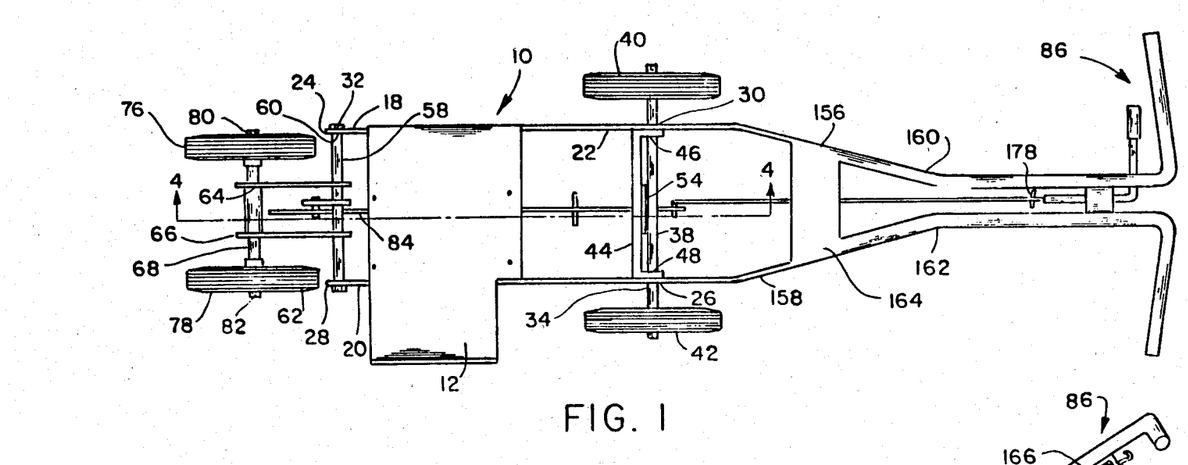
FIG. 1 is a top plan view of the lawn edger of the present invention with the motor and cutter blade mechanism removed.
Figure 2:
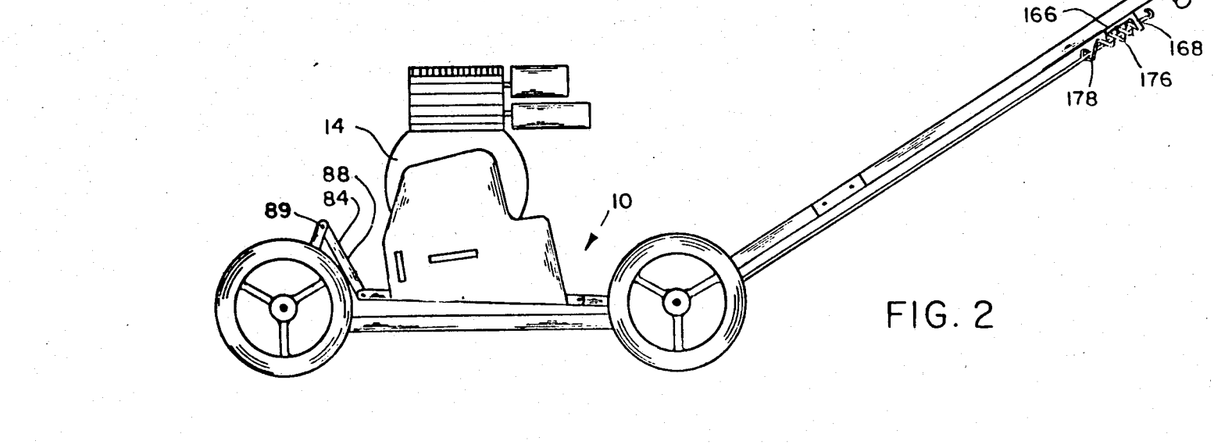
FIG. 2 is a side elevational view of the lawn edger shown in FIG. 1 but shows the motor mechanism attached to the platform.
Figure 3:
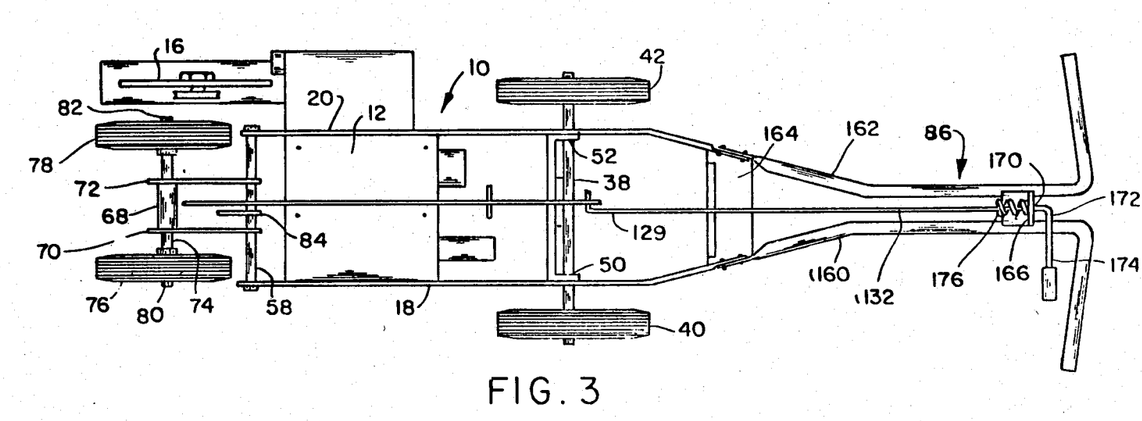
FIG. 3 is a bottom plan view of the lawn edger shown in FIG. 1 but shows the motor and cutter blade mechanism attached to the platform.

FIG. 1 is a top plan view of a lawn edger generally designated 10 with motive means and the cutter assembly removed. The edger 10 includes a platform 12 for supporting motive means which may either be a motor or an engine 14 and a cutter blade 16 shown representatively in FIGS. 2 and 3. The platform 12 includes plural elongate members 18 and 20 which are spaced and parallel relative to each other. The member 18 includes a first and a second end 22 and 24, respectively, and the second member 20 includes a first and a second end 26 and 28, respectively. The ends 22, 24, 26 and 28, respectively, define bores 30, 32, 34 and 36. A first axle 38 extends through bores 30 and 34 and rotatably supports plural first ground-engaging wheels 40 and 42, respectively. A U-shaped support bar 44 extends between the first ends 22 and 26 of the members 18 and 20, with limbs 46 and 48 of a bar 44 defining bores 50 and 52, respectively, such that the bores 50 and 52 are aligned with and disposed adjacent the bores 30 and 34 to permit the first axle 38 to extend therethrough. The limbs 46 and 48 are secured to the first and second members 18 and 20 by means (not shown) such as fasteners or welds. A plate 54 is rigidly secured to and depends from the bar 44 midway along the length of the bar 44. The plate 54 shown more particularly in FIG. 6 defines a slot 56 which cooperates with a toothed portion of a connecting arm to be described in greater detail hereinafter.

As shown more particularly in FIGS. 1, 2, 3, 4 and 5, a second axle 58 extends through bores 32 and 36, respectively, such that the second axle 58 is rotatably supported by the second ends 24 and 28 of the members 18 and 20, respectively. Means shown as cotter pins 60 and 62 maintain the lateral disposition of the second axle 58 relative the members 18 and 20. A first and a third arm 64 and 66, respectively, extend radially from the longitudinal axis of the second axle 58. A tube 68 extends between the distal ends 70 and 72, respectively, of the arms 64 and 66. A third axle 74 extends through and is rotatably supported by the tube 68 such that the third axle 74 is parallel and spaced relative the first and second axles 38 and 58. Second ground engaging wheel means shown as wheels 76 and 78 are secured adjacent opposite ends 80 and 82 of the third axle 74 such that the first and third arms 64 and 66 are disposed between the wheels 76 and 78. A second arm 84 is rigidly connected to the second axle 58 between the first and fourth arms 64 and 66. The second arm 84 extends radially relative the longitudinal axis of the second axle 58 away from the longitudinal plane of the platform 12 on the same side of the longitudinal plane of the platform as a handle generally designated 86 to be described hereinafter. A distal end 88 of the second arm 84 is connected by a pivot 89 to a first end 90 of a first portion 92 of a connecting arm generally designated 94 as shown particularly in FIGS. 4 and 5. A second or toothed portion 98 of the connecting arm 94 is angularly disposed relative the first portion 92 by a bend 96. The first portion 92 depends from the pivot 89 at the distal end 88 of the second arm 84 towards the longitudinal plane of the platform 12. The second or toothed portion 98 of the connecting arm 94 is disposed on the opposite side of the longitudinal plane of the platform 12 relative to the handle 86 and extends normal to the longitudinal axis of the second axle 58. A distal end 100 of the second portion 98 slidably extends through a slot 56 defined by the locking plate 54.

Figure 4:
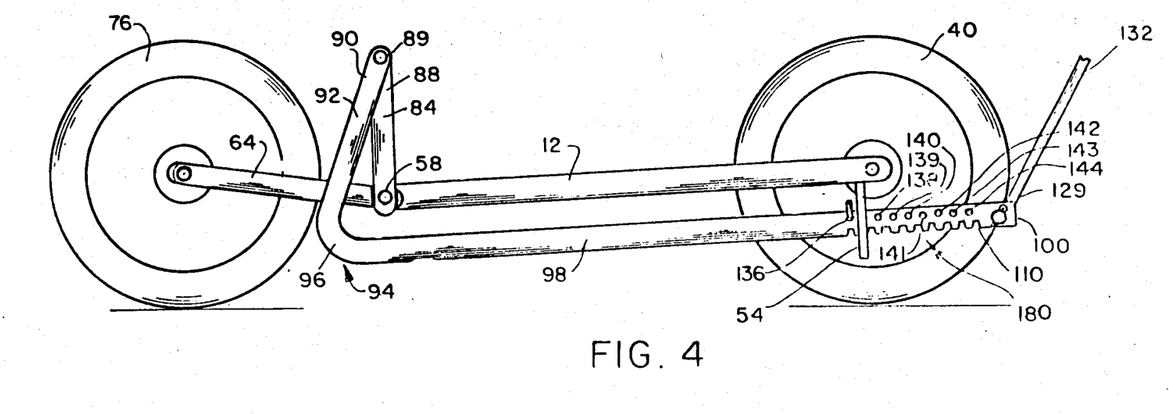
FIG. 4 is an enlarged sectional view taken on the line 4—4 of FIG. 1 and shows the edger lowered relative the ground.
Figure 5:
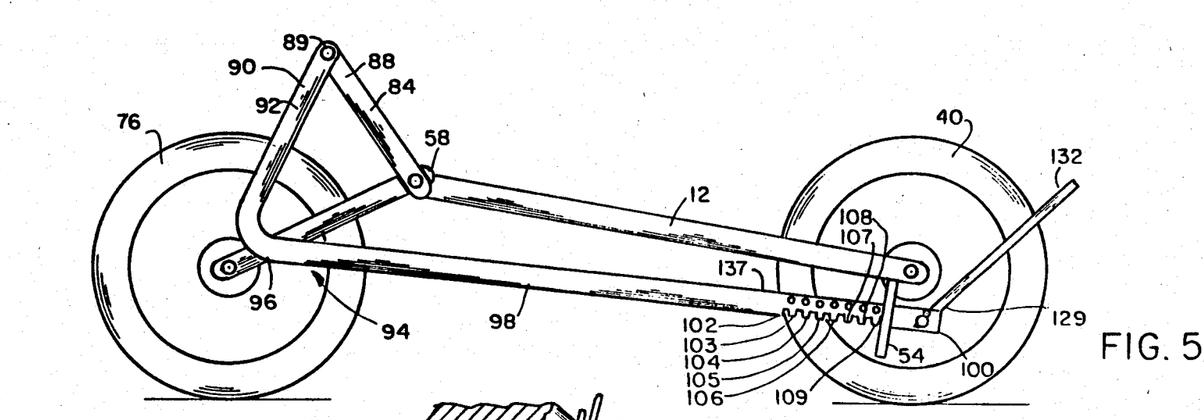
FIG. 5 is a similar view to that of FIG. 4 but shows the toothed portion and locking plate adjusted such that the edger is raised relative the ground.
Figure 6:
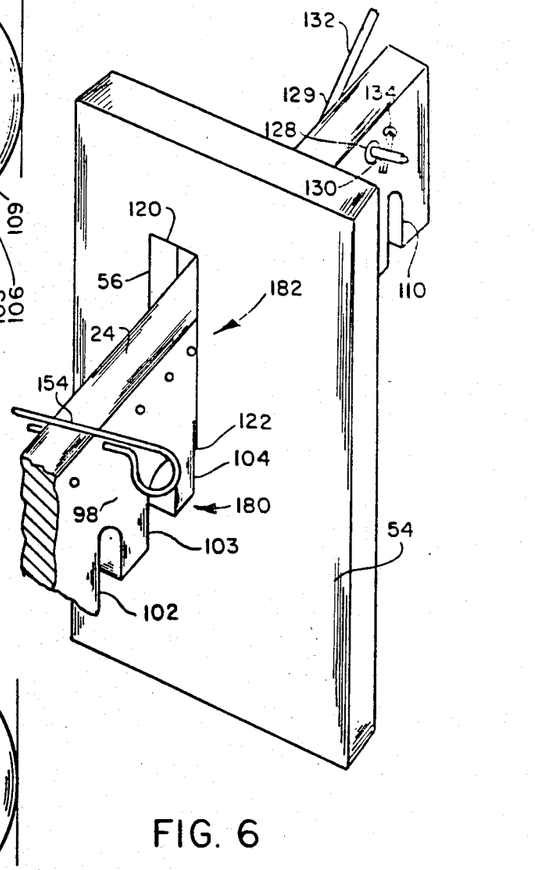
FIG. 6 is an enlarged fragmentary representation of the toothed portion of the connecting arm and the locking plate.

As shown more particularly in FIGS. 4, 5 and 6, the second portion 98 of the connecting arm 94 defines a plurality of teeth 102, 103, 104, 105, 106, 107, 108, 109 and 110. The slot 56 includes a first and a second end 120 and 122, the first end 120 being disposed adjacent the bar 44 and the second end 122 being disposed remote from the bar 44. The second end 122 cooperates with the teeth 102–110 such that the longitudinal disposition of the second or toothed portion 98 may be variably adjusted. The slot 56 has a length between the ends 120 and 122 that is greater than the combined height of the second portion 98 and the height of one of the teeth thereby permitting the second portion to be moved from engagement with the second end 122 of the slot 56 towards the first end 120 of the slot 56. When the top surface 124 of the second portion 98 is disposed adjacent the first end 120 of the slot 56, the second portion 98 may be moved longitudinally through the slot 56. The distal end 100 of the second or toothed portion 98 defines an aperture 128 as best shown in FIG. 6. A distal end 129 of a control means 132, shown as a rod, is connected by a pivot 130 received through the aperture 128 and a cotter pin 134 to lock the pivot 130 in engagement with the aperture 128. A plurality of holes 136, 137, 138, 139, 140, 141, 142, 143 and 144 are defined by the second or toothed portion 98 and are disposed respectively adjacent the teeth 102–110. A locking pin 154 is removably located in any one of the holes 136–144 to limit the longitudinal disposition of the second portion 98 relative the plate 54.

The handle 86 which is angularly disposed and rigidly connected to the first ends 22 and 26 of the members 18 and 20, is of relatively lightweight construction when compared with the handles of prior art devices.

The handle arms 156 and 158, respectively, of the handle 86 may be fabricated from steel bar of the same cross sectional dimensions as the members 18 and 20. Extensions 160 and 162 of the handle arms 156 and 158, respectively, may be fabricated from lightweight tubular material. A tie plate 164 reinforces and ties the the arm 158 and extension 160 to the arm 158 and extension 162. A depending bracket 166 is rigidly connected to and bridges between the extensions 160 and 162, respectively. A depending limb 168 of the bracket 166 defines a hole 170 which slidably receives the hand control 132. The end 172 of the hand control 132 adjacent the bracket 166 includes a lever 174 angularly disposed relative the hand control 132 such that the operator of the edger may pull the hand control 132 axially relative the extensions 160 and 162. A compression spring 176 disposed coaxial with the hand control 132 reacts with a notch 178 formed on the hand control 132 and the depending limb 168 of the bracket 166 to urge the hand control 132 to slide axially through the hole 170 to lock one of the teeth 102-110 into engagement with the second end 122 of the slot 56. The hand control 132 and the teeth of the second portion 98 provide an adjustable position retaining plate mechanism which is generally designated 180. The plate 54 and slot 56 provide a locking plate mechanism generally designated 182.

In operation of the lawn edger 10, when the cutter blade 16 is to be lowered to provide a greater depth of cut relative the ground, the lever 174 is pulled axially relative the extensions 160 and 162. The hand control 132 moves axially relative the extensions 160 and 162. The control means, which is an extension of the hand control reacts with the distal end 100 of the second portion 98 to pull the toothed portion upwardly to disengage the second or toothed portion 98 from the end 122 of the locking plate mechanism 182. With the locking plate 182 and the toothed portion mechanism 180 disengaged, the handle 86 is manually lifted aided by the combined weight of the motor 14 and cutter blade 16 to pivot the platform 12 downwardly about the first axle 38. The disengagement of the locking plate and toothed portion mechanisms 182 and 180 permits the first and third arms 64 and 66 to pivot about the second axle 58 because the toothed portion mechanism 180 is free to slide axially through the slot 56. With the locking plate and toothed portion mechanisms 182 and 180 disengaged, the platform 12 pivots about the first axle 38. The platform assumes the position shown in FIG. 4 when the lever 174 is released and the tooth 102 cooperates with the locking plate mechanism 182. The locking pin 154 limits the axial movement of the toothed portion mechanism 180 relative the locking plate 182 thereby limiting the depth to which the cutter blade 16 can be lowered.

When the cutter blade 16 is to be adjusted to a higher level than that shown in FIG. 4, the lever 174 is again pulled to release the locking plate and toothed portion mechanisms 182 and 180, respectively. The handle 86 is pivoted about the first axle 38 to lift the platform 12 angularly relative the ground. Because the locking plate and toothed portion mechanisms are disengaged, wheels 76 and 78 pivot downwardly under the influence of gravity and the first portion 92 of the connecting arm 94 will pivot about the distal end of the second arm 84 and the toothed portion mechanism 180 will slide through the slot 45 to assume the position shown in FIG. 5. When the lever 174 is released, the spring 176 will urge the toothed portion mechanism 180 into engagement with the locking plate mechanism 182 to lock the locking plate and toothed portion mechanisms and to lock the depth of the cutter blade 16 relative the ground.

The lawn edge of the present invention provides an extremely rugged mechanism for variably adjusting the depth of the cutting blade relative the ground. The mechanism is controlled from the handle by a lightweight hand control which unlike the prior art devices does not take any of the torsional strain of the depth control mechanism. The hand control merely engages and disengages the toothed portion and locking plate mechanisms which are disposed below the longitudinal plane of the platform. The edger of the present invention does not require a rugged handle and associated components in order to withstand the strain imposed on the depth control lever and the like of prior art devices and because of this, the cost of manufacturing the edger of the present invention is greatly decreased.

An alternative embodiment of the present invention is shown with reference to FIGS. 7-10 in which a lawn edger generally designated 200 includes a motive means 202 and a cutter blade 204. The lawn edger 200 includes a frame 206 having a plurality of ground engaging wheels 208, 209 and 210 rotatably secured to the frame 206 for movably supporting the frame 206 from the ground G. A platform 212 supports the motive means 202 with the plat form 212 being pivotally secured to the frame 206 by means of an axle 214.

A cutter blade support means 216 for rotatably supporting the cutter blade 204 is pivotally connected to the frame 206 such that the pivotal axis PCB of the cutter blade and the pivotal axis PP of the platform 212 are parallel relative to each other, the cutter blade 204 being rotated by the motive means 202.

A position retaining means 218 is pivotally connected to the cutter blade support means 216 with the position retaining means 218 cooperating with the frame 206 for varying the pivotal disposition of the cutter blade support means 216 relative to the frame 206.

Figure 7:
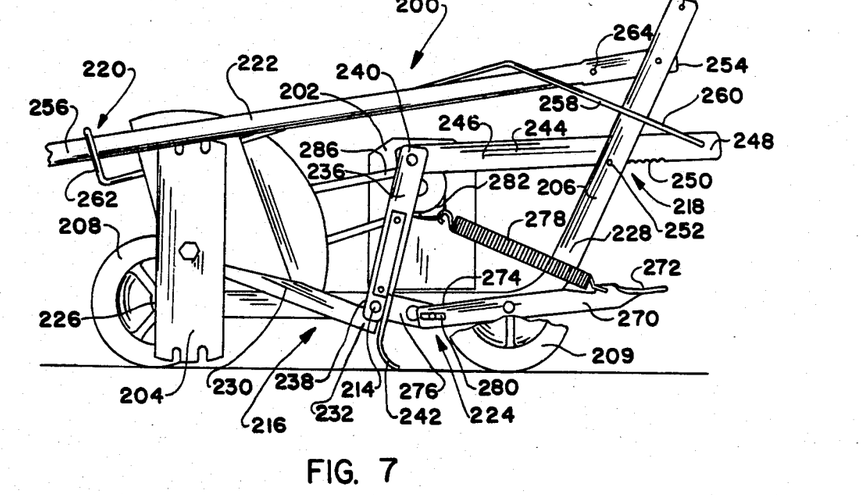
FIG. 7 is a side elevational view of an alternative embodiment of the present invention showing the lawn edger in a non-operative, folded position thereof.
Figure 9:
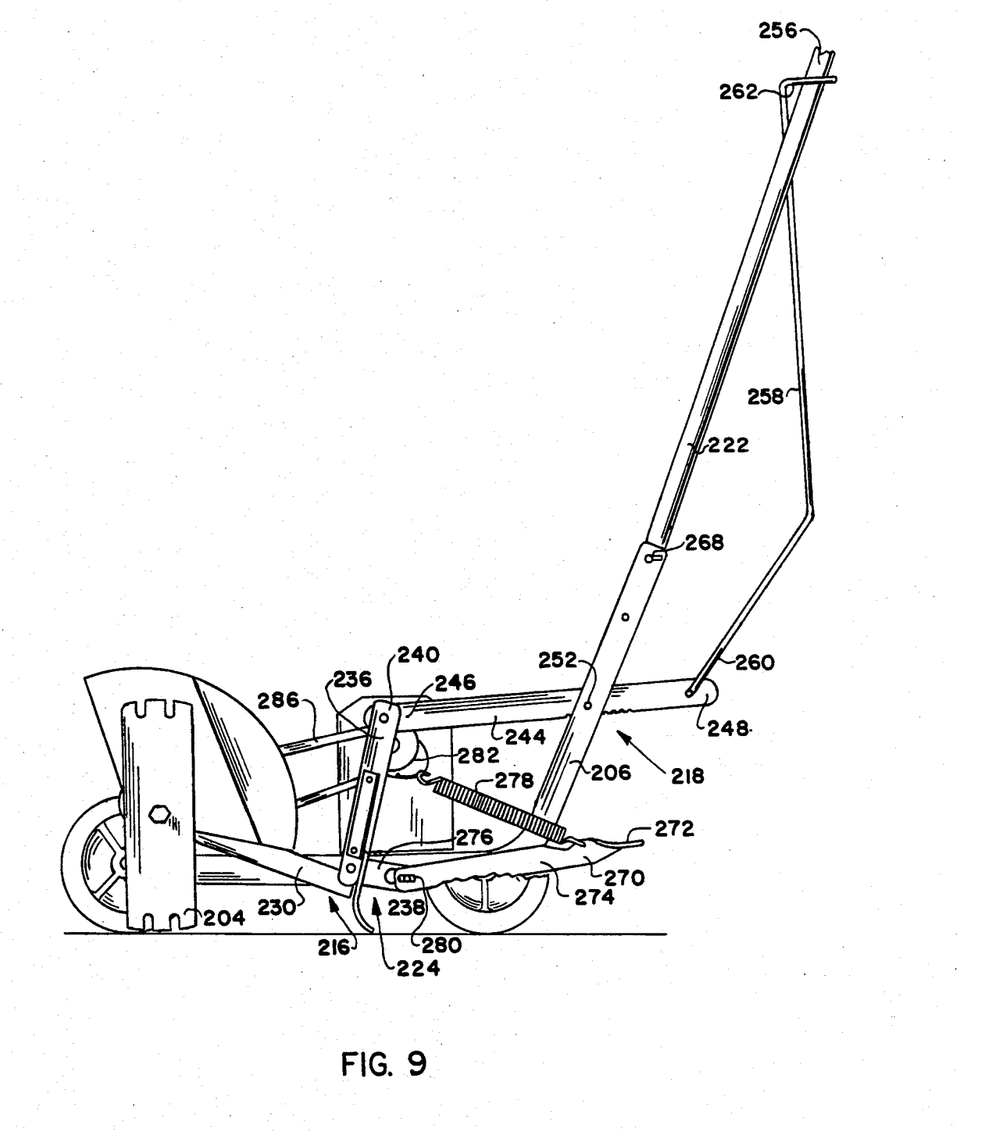
FIG. 9 is a side elevational view of the lawn edger shown in FIG. 7 but with the handle raised to the locked first position thereof.
Figure 10:
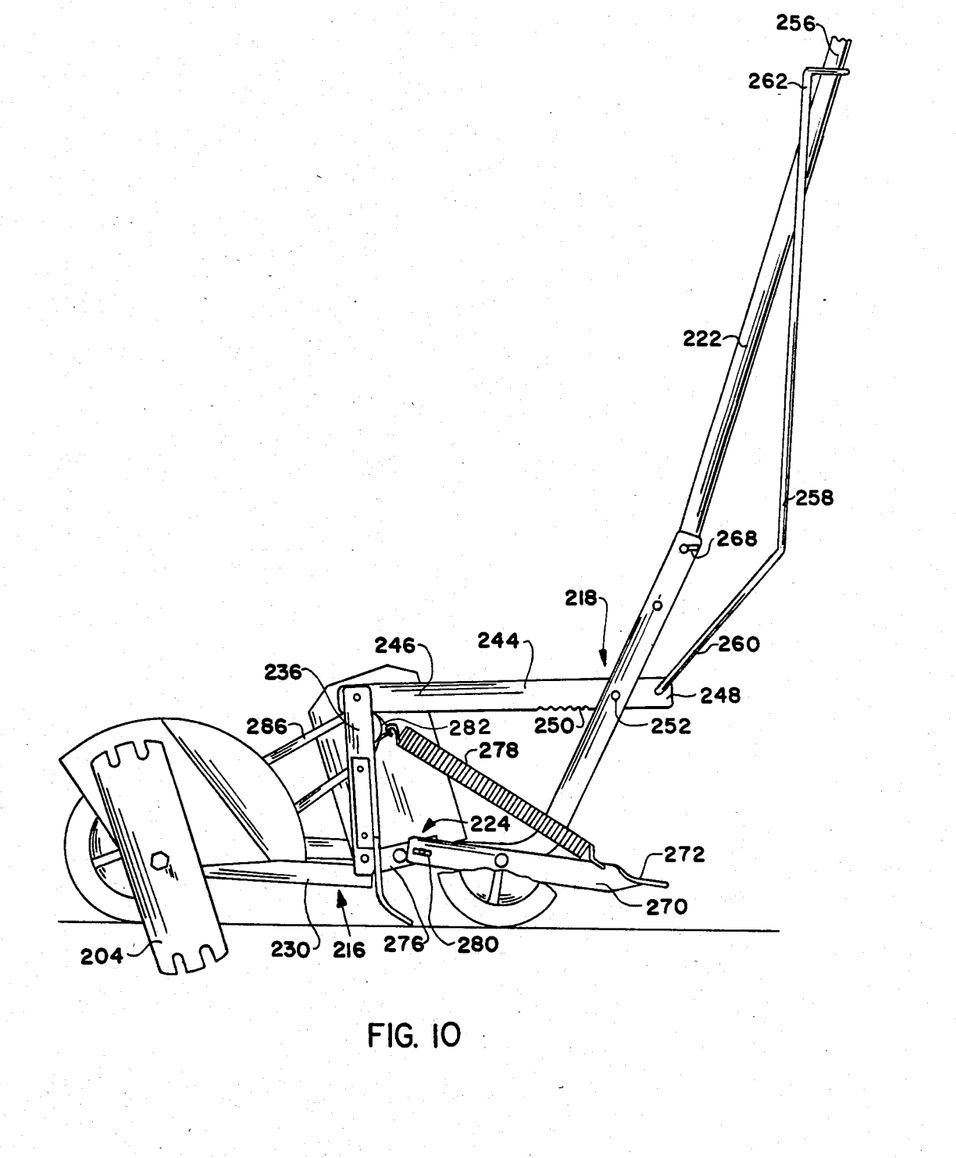
FIG. 10 is a similar view to that shown in FIG. 9 but shows the lawn edger with the cutter blade lowered for use thereof.

A hand control means 220 is connected to the position retaining means 218 for remotely controlling the disposition of the position retaining means 218 relative to the frame 216 for adjustably varying the depth of the cutter blade 204 relatie to the ground G. The lawn edger 200 also includes a handle 222 which is pivotally secured to the frame 206 such that the handle 222 pivots from a first position as shown in FIGS. 7 and 8 in which the handle 222 is disposed in close proximity relative to the cutter blade 204 and the motive means 202 for storage and shipping of the lawn edger 200 to a second position as shown in FIGS. 9 and 10 in which the handle 222 is disposed remote from the cutter blade 204 and the motive means 202 in a substantially upright position for permitting hand control of the lawn edger 200 during use of the edger.

As shown in FIGS. 7-10, the lawn edger 200 further includes a clutch means generally designated 224 for selectively permitting the cutter blade 204 to be driven by the motive means 202.

Figure 8:
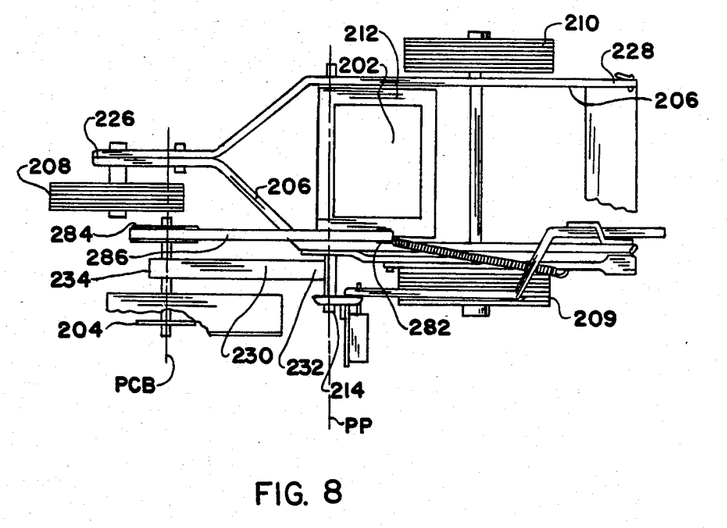
FIG. 8 is a fragmentary top plan view of the lawn edger shown in FIG. 7.

As shown more particularly in FIG. 8, the lawn edger 200 includes the frame 206 having a leading end 226 and a trailing end 228. A leading wheel 208 of the plurality of ground engaging wheels 208, 209 and 210 is rotatably secured to the leading end 226 of the frame 206. A pair of trailing wheels 209 and 210 of the plurality of ground engaging wheels are rotatably secured to the trailing end 228 of the frame 206.

In the embodiment shown in FIGS. 7-10, the platform 212 and the cutter blade support means 216 pivot about the same pivotal axis PP, and the cutter blade support means 216 further includes a first arm 230 having a proximal and a distal end 232 and 234 respectively shown in FIG. 8. The proximal end 232 of the first arm 230 is pivotally connected to the frame 206 such that the first arm 230 pivots about axis PP, and the distal end 234 of the first arm 230 rotatably supports the cutter blade 204. A second arm 236 includes a proximal and a distal end 238 and 240, respectively. The proximal end 238 of the second arm 236 is rigidly connected to the proximal end 232 of the first arm 230, and the second arm 236 extends angularly away from the first arm 230. A debris flap 242 is rigidly secured to the second arm 236 for inhibiting passage of debris from the rotating cutter blade 204 past the debris flap 242.

The position retaining means 218 further includes a third arm 244 which has a proximal and a distal end 246 and 248, respectively. The proximal end 246 of the third arm 244 is pivotally connected to the cutter blade support means 216 and more specifically to the distal end 240 of the second arm 236. A plurality of indentations or teeth generally designated 250 are defined by and are spaced longitudinally along the third arm 244. Stop means 252 extend from the frame 206 for selectively cooperating with one of the plurality of indentations 250 such that the pivotal disposition of the cutter blade support means 216 is variably adjustable relative to the frame 206.

The hand control means 220 shown more particularly with reference to FIGS. 9 and 10 further includes the handle 222 having a proximal and a distal end 254 and 256 respectively. The proximal end 254 of the handle 222 is secured to the frame 206 for permitting guidance of the lawn edger 200 during use of the edger. An elongated rod 258 includes a proximal and a distal end 260 and 262 respectively. The proximal end 260 of the rod 258 is pivotally secured to the position retaining means 218. The distal end 262 of the rod 258 slidably cooperates with the distal end 256 of the handle 222 such that relative movement between the distal end 262 of the rod 258 and the distal end 256 of the handle 222 results in movement of the position retaining means 218 relative to the frame 206 for varying the depth of the cutter blade 204 relative to the ground G.

As shown particularly wiht reference to FIG. 7, the handle 222 and the frame 206 define holes 264 and 266 respectively, which are aligned relative to each when the handle 222 is disposed in the second position as shown in FIGS. 9 and 10. A locking means 268 removably extends within the aligned holes 264 and 266 for locking the handle 222 in the second position during the use of the lawn edger 200 such that removal of the locking means 268 permits folding of the handle 222 to the first portion thereof when the locking means 268 is removed from between the holes 264 and 266.

As shown particularly with reference to FIGS. 7, 9 and 10, the lawn edger 200 further includes the clutch means generally designated 224. The clutch means 224 includes a foot-operated lever 270 having a first and a second end 272 and 274, respectively. The lever 270 is pivotally connected between the first and the second end 272 and 274 of the lever 270 to the frame 206 such that the lever 270 pivots about the same axis as the axis of rotation of the wheels 209 and 210. An extension 276 of the platform 212 cooperates with the second end 274 of the lever 270, and a biasing means 278 shown in FIGS. 7-10 as a tension spring extends between the lever 270 and the motive means 202. A lost motion means generally shown as an elongated groove 280 is disposed respectively at the second end 274 of the lever 270 and the extension 276 such that when the lever 270 is pivoted by application of pressure to the first end 272 of the lever 270 in use of the edger 200, the lever 270 pivots in opposition to the biasing means 278 to urge the extension 276 and the platform 212 from a first position of the platform as shown in FIGS. 7, 8 and 9 in which the motive means 202 is drivingly connected to the cutter blade 204 to a second position as shown in FIG. 10 of the platform 212 in which the motive means 202 is disconnected from the cutter blade 204. The clutch means 224 further includes a drive pulley 282 rigidly connected to the motive means 202 and a driven pulley 284 rigidly connected to the cutter blade 204. A drive belt 286 cooperates with the drive and driven pulleys 282 and 284 respectively for selectively driving the cutter blade 204.

In operation of the alternative embodiment of the present invention as shown in FIGS. 7-10, FIG. 7 shows the lawn edger 200 with the handle 222 disposed in the first position thereof, the handle 222 being folded downwardly over the cutter blade 204 and the motive means 202. When the lawn edger 200 is to be used, the handle 222 is moved from the first position as shown in FIG. 7 to the second position thereof as shown in FIG. 9. When the handle is disposed in the upright position, as shown in FIG. 9, the holes 266 and 264 in the frame 206 and the handle 222, respectively, are brought into alignment relative to each other and the locking means 268 shown in FIG. 9 is inserted through the aligned holes 264 and 268 to lock the handle 222 in the upright position thereof.

With the lawn edger shown in the position illustrated in FIG. 9, the motive means 202 is moved in the disengaged position thereof, as shown in FIG. 10. This disengaged disposition of the motive means 202 relative to the cutter blade 204 is accomplished by applying foot pressure to the lever 270 in opposition to the biasing means 278 such that downward movement of the first end 272 of the lever 270 causes upward movement of the second end 274 of the lever 270, which cooperates by the lost motion means 280 to pivot the extension 276 which is rigidly secured to the platform 212 into a counterclockwise disposition of the platform 212 and the motive means 202, as viewed in FIG. 10.

With the motive means which may be an internal combustion engine in the disposition shown in FIG. 10, the motive means 202 is started and the motive means 202 will be disconnected from the cutter blade 204.

With the motive means rotating the drive pulley 282 and with the cutter blade 204 still in the position shown in FIG. 9, the distal end 262 of the rod 258 is moved by operator's hand relative to the distal end of the handle such that the distal end 248 of the third arm 244 is moved upwardly out of engagement with the stop means 252, and the weight of the cutter blade and the cutter blade supporting means 216 cause the cutter blade 204 to assume the position shown in FIG. 10, and the pivotal movement of the cutter blade support means 216 brings the driven pulley 284 into driven engagement with the motive means so that the motive means causes rotation of the cutter blade. The rod 258 is released to permit the third arm 244 to lock relative to the frame by the interaction of the stop means 252 and one of the indentations 250.

In the position of the lawn edger as shown in FIG. 10, the lawn edger may be used to cut the edge of a lawn and the debris flap is in the correct position for preventing the passage of debris past the same.

When the cutting operation is completed, the distal end 262 of the rod 258 is once again pulled upwardly by the operator of the lawn edger, and the third arm 244 is disengaged from the stop means 252, and the foot operated lever 270 is rotated in a counter clockwise direction by the spring 278 as shown in FIG. 10, thereby releasing the lost motion means 280 and permitting the biasing means 278 to simultaneously rotate the motive means in a clockwise direction and to pivot the cutter blade support means 216 in a clockwise direction such that the cutter blade 204 is raised out of engagement with the edge of the lawn.

The lawn edger of the alternative embodiment as shown in FIGS. 7-10 provides a lawn edger having an adjustable depth control means which is disposed for cooperation with the relatively massive structure of the lawn edger frame, and the position retaining means is remotely controlled by means of a hand control of relatively light construction. In the prior art devices the handle of such lawn edgers usually incorporated the depth control mechanism which required the handle to be built of relatively massive and rigid material to withstand the strain imposed upon the structure by the depth control mechanism. Furthermore, the present invention as shown in FIGS. 7-10 provides a lawn edger which may be folded for compact storage within the user's garage or tool shed. The foldable nature of the lawn edger as shown in FIGS. 7-10 also reduces the cost of shipping the lawn edger as the lawn edger folds to a size that facilitates the package of the same within a relatively small container.

The present disclosure includes that contained in the appended claims as well as that of the foregoing description. Although the invention has been described in its preferred form with a certain degree of particularity, it is understood that the present disclosure of the preferred form has been made only by way of example and that numerous changes in the details of the construction and the combination and arrangement of parts may be resorted to without departing from the spirit and scope of the invention.

What is claimed is:

1. A lawn edger having a power means and a cutter blade, comprising:
   a frame;
   a plurality of ground engaging wheels rotatably secured to said frame for movably supporting said frame at a constant distance from the ground;
   a platform for supporting the power means, said platform being pivotally secured to said frame;
   cutter blade support means for rotatably supporting the cutter blade, said cutter blade support means being pivotally connected to said frame such that the pivotal axis of said cutter blade support means and the pivotal axis of said platform are parallel relative to each other, the cutter blade being rotated by the power means;
   said cutter blade support means further including a first arm and a second arm;
   said first arm of said cutter blade support means having a proximal end and a distal end, said proximal end of said first arm being pivotally connected to said frame, said distal end of said first arm rotatably supporting the cutter blade;
   said second arm of said cutter blade support means having a proximal end and a distal end, said proximal end of said second arm being rigidly connected to said proximal end of said first arm, said second arm extending angularly away from said first arm;
   position retaining means pivotally connected to said distal end of said second arm of said cutter blade support means, said position retaining means cooperating with said frame for varying the pivotal disposition of said cutter blade support means relative to said frame;
   a clutch means operatively connected with said cutter blade support means; and
   a control means connected to said position retaining means to selectively raise said blade and for remotely controlling the disposition of said position retaining means relative to said frame for adjusting the depth of the cutter blade relative to the ground in response to movement of said clutch means.

2. A lawn edger as set forth in claim 1 further including:
   a handle pivotally secured to said frame such that said handle pivots from a first position in which said handle is disposed in close proximity relative to the cutter blade and the power means for storage and shipping of the lawn edger to a second position of said handle in which said handle is disposed remote from the cutter blade and the power means in a substantially upright position for permitting hand control of the lawn edger during use of the edger.

3. A lawn edger as set forth in claim 2, wherein said handle and said frame define holes which are aligned relative to each other when said handle is disposed in said second position;
   locking means removably extending within said aligned holes for locking said handle in said second position during use of the lawn edger and permitting folding said handle to first position when said locking means is removed from between said holes.

4. A lawn edger as set forth in claim 1 further including:
   said clutch means for selectively permitting the cutter blade to be driven by the power means.

5. A lawn edger as set forth in claim 1 wherein said frame further includes:
   a leading end and a trailing end;
   a leading wheel of said plurality of ground engaging wheels being rotatably secured to said leading end of said frame;
   a pair of trailing wheels of said plurality of ground engaging wheels, said trailing wheels being rotatably secured to said trailing end of said frame.

6. A lawn edger as set forth in claim 1 wherein said platform and said cutter blade support means pivot about the same pivotal axis.

7. A lawn edger as set forth in claim 1 wherein said cutter blade support means further includes:
   a debris flap rigidly secured to said second arm for inhibiting passage of debris from the rotating cutter blade past said debris flap.

8. A lawn edger as set forth in claim 1, wherein said position retaining means further includes:
   a third arm having a proximal and a distal end, said proximal end of said third arm being pivotally connected to said cutter blade support means;
   a plurality of indentations defined by said third arm, said indentations being spaced longitudinally along said third arm;

stop means extending from said frame for selectively cooperating with one of said plurality of indentations such that the pivotal disposition of said cutter blade support means is variably adjustable relative to said frame.

9. A lawn edger as set forth in claim 1, wherein said clutch means further includes:
 a foot operated lever having a first and a second end, said lever being pivotally connected between said first and second end of said lever to said frame;
 an extension of said platform cooperating with said second end of said lever;
 biasing means extending between said lever and the power means;
 lost motion means disposed respectively at said second end of said lever and at said extension such that when said lever is pivoted by application of pressure to said first end of said lever in use of the edger, said lever pivots in opposition to said biasing means to urge said extension and said platform from a first position of said platform in which the motive means is drivingly connected to the cutter blade, to a second position of said platform in which the motive means is disconnected from the cutter blade.

10. A lawn edger as set forth in claim 9, wherein said clutch means further includes:
 a drive pulley rigidly connected to the power means;
 a driven pulley rigidly connected to the cutter blade;
 a drive belt cooperating with said drive and driven pulleys for selectively driving the cutter blade.

11. A lawn edger as set forth in claim 1 wherein said clutch means is foot operated.

12. A lawn edger as set forth in claim 1 wherein said control means is hand controlled.

13. A lawn edger as set forth in claim 12, wherein hand control means further includes:
 a handle having a proximal and a distal end, said proximal end of said handle being secured to said frame for permitting guidance of the lawn edger during use of the edger;
 an elongated rod having a proximal and a distal end, said proximal end of said rod being pivotally secured to said position retaining means, said distal end of said rod slidably cooperating with said distal end of said handle such that relative movement between said distal end of said rod and said distal end of said handle results in movement of said position retaining means relative to said frame for varying the depth of the cutter blade relative to the ground.

14. A lawn edger having a power means and a cutter blade, comprising:
 a frame;
 a plurality of ground engaging wheels rotatably secured to said frame for movably supporting said frame at a constant distance from the ground;
 a platform for supporting the power means, said platform being pivotally secured to said frame;
 cutter blade support means for rotatably supporting the cutter blade, said cutter blade support means being pivotally connected to said frame such that the pivotal axis of said cutter blade support means and the pivotal axis of said platform are parallel relative to each other, the cutter blade being rotated by the power means;
 said cutter blade support means further including a first arm and a second arm;
 said first arm of said cutter blade support means having a proximal end and a distal end, said proximal end of said first arm being pivotally connected to said frame, said distal end of said first arm rotatably supporting the cutter blade;
 said second arm of said cutter blade support means having a proximal end and a distal end, said proximal end of said second arm being rigidly connected to said proximal end of said first arm, said second arm extending angularly away from said first arm;
 position retaining means pivotally connected to said distal end of said second arm of said cutter blade support means, said position retaining means cooperating with said frame for varying the pivotal disposition of said cutter blade support means relative to said frame;
 a clutch means operatively connected with said cutter blade support means;
 a control means connected to said position retaining means to selectively raise said blade and for remotely controlling the disposition of said position retaining means relative to said frame for adjusting the depth of the cutter blade relative to the ground in response to movement of said clutch means; and
 a handle pivotally secured to said frame such that said handle pivots from a first position in which said handle is disposed in close proximity relative to the cutter blade and the power means for storage and shipping of the lawn edger to a second position of said handle in which said handle is disposed remote from the cutter blade and the power means is a substantially upright position for permitting hand control of the lawn edger during use of the edger.

* * * * *

UNITED STATES PATENT AND TRADEMARK OFFICE
CERTIFICATE OF CORRECTION

PATENT NO. : 4,645,011

DATED : February 24, 1987

INVENTOR(S) : Feikema et al.

It is certified that error appears in the above-identified patent and that said Letters Patent are hereby corrected as shown below:

In the Specification
Column 12, line 38, delete ", as shown in Fig. 10".

In the Claims
Claim 3, column 14, line 42, delete "said" and insert therefor --a--.

Signed and Sealed this

Twenty-fifth Day of August, 1987

Attest:

DONALD J. QUIGG

Attesting Officer

Commissioner of Patents and Trademarks